United States Patent
Keskitalo et al.

(10) Patent No.: US 11,387,892 B2
(45) Date of Patent: Jul. 12, 2022

(54) METHOD, SYSTEM AND APPARATUS FOR RESOURCE ALLOCATION IN MULTI-HOP SYSTEMS

(71) Applicant: NOKIA SOLUTIONS AND NETWORKS OY, Espoo (FI)

(72) Inventors: Ilkka Keskitalo, Oulu (FI); Esa Tapani Tiirola, Kempele (FI); Esa Mikael Malkamäki, Espoo (FI); Juha Sakari Korhonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/767,573

(22) PCT Filed: Jan. 17, 2018

(86) PCT No.: PCT/EP2018/051115
§ 371 (c)(1),
(2) Date: May 27, 2020

(87) PCT Pub. No.: WO2019/141356
PCT Pub. Date: Jul. 25, 2019

(65) Prior Publication Data
US 2021/0036765 A1    Feb. 4, 2021

(51) Int. Cl.
*H04B 7/155* (2006.01)
*H04W 72/04* (2009.01)
(Continued)

(52) U.S. Cl.
CPC .... *H04B 7/15542* (2013.01); *H04W 72/0446* (2013.01); *H04W 84/047* (2013.01); *H04W 92/20* (2013.01)

(58) Field of Classification Search
CPC ............ H04B 7/15542; H04W 72/0446
(Continued)

(56) References Cited

U.S. PATENT DOCUMENTS

2011/0310814 A1\* 12/2011 Callard ............... H04B 7/155
370/329
2016/0338087 A1\* 11/2016 Ratasuk ............ H04W 72/1263
(Continued)

OTHER PUBLICATIONS

U.S. Appl. No. 62/609,216, filed Dec. 21, 2017.\*
(Continued)

*Primary Examiner* — Faisal Choudhury
(74) *Attorney, Agent, or Firm* — Brake Hughes Bellermann LLP

(57) ABSTRACT

An apparatus comprising at least one processor and at least one memory including computer code for one or more programs, the at least one memory and the computer code configured, with the at least one processor, to cause the apparatus at least to support for a determined period at least one hop within a multi-hop self-backhaul communications, wherein the determined period comprises: a first part within which information for controlling dynamic allocation between backhaul and access links within resource slots is passed between the apparatus and at least one further apparatus in the multi-hop self-backhaul communications; and a second part within which a dynamic slot pattern is implemented based on the information for controlling dynamic allocation between backhaul and access links within resource slots is passed between the apparatus and at least one further apparatus in the multi-hop self-backhaul communications.

17 Claims, 8 Drawing Sheets

(51) Int. Cl.
*H04W 84/04* (2009.01)
*H04W 92/20* (2009.01)

(58) Field of Classification Search
USPC .......................................................... 370/327
See application file for complete search history.

(56) References Cited

U.S. PATENT DOCUMENTS

2017/0196015 A1* 7/2017 Lu .......................... H04W 72/12
2017/0302359 A1* 10/2017 Guo ....................... H04W 92/12
2019/0199422 A1* 6/2019 Li ............................. H04B 7/04

OTHER PUBLICATIONS

3GPP TSG RAN WG1 Meeting #91 R1-1720606; Reno, USA, Nov. 27-Dec. 1, 2017.*
International Search Report and Written Opinion for International Application No. PCT/EP2018/051115, dated Oct. 11, 2018 (12 pages).
Office Action for European Application No. 18701143.2, dated Jan. 25, 2022, 3 pages.

* cited by examiner

METHOD, SYSTEM AND APPARATUS FOR RESOURCE ALLOCATION IN MULTI-HOP SYSTEMS

CROSS-REFERENCE TO RELATED APPLICATIONS

This application is a national stage entry of International Application No. PCT/EP2018/051115, filed Jan. 17, 2018, entitled "METHOD, SYSTEM AND APPARATUS FOR RESOURCE ALLOCATION IN MULTI-HOP SYSTEMS" which is hereby incorporated by reference in its entirety.

FIELD

The present application relates to a method, apparatus, system and computer program and in particular but not exclusively to a method and apparatus for wireless backhaul in a 5G New Radio communications network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio), long-term evolution (LTE) of the Universal Mobile Telecommunications System (UMTS), and now 5G New Radio (NR) radio-access technology. 5G NR is being standardized by the 3rd Generation Partnership Project (3GPP).

One of the aspects of 5G New Radio (NR) is the physical layer design and related NR functionalities for enhanced mobile broadband (eMBB) and ultra-reliable low-latency-communication (URLLC). The NR under this work item (NR Phase I) should consider frequency ranges up to 52.6 GHz. It is expected that NR work continues after Phase I with various enhancements, including also frequency ranges larger than 52.6 GHz. The 5G NR should be able to allow network deployment with minimized manual efforts and as automated self-configuration as possible. Especially on higher frequency bands the coverage can be an issue and specific capabilities are needed for NR to enable easy coverage extension with minimized/none requirements for network (re-)planning in a fast and cost-effective manner.

NR thus (and mainly for these reasons) has the requirement to support self-backhauling where the same carrier is used for the backhaul connection and the access links. In other words enabling in-band backhaul operation. A specific relaying node can be used to provide wireless backhaul connection (instead of having a wired connection) to a base station with fixed connection to the network backhaul. The serving base station(s) then may have the overall control of the usage of the radio resources considering both access and backhaul links.

The considered self-backhauling scenarios include both frequency division duplex (FDD) and time division duplex (TDD). However, is expected that TDD scenarios are more important in the commercial deployments. Another common assumption for relay nodes in TDD scenario is that a RN cannot transmit and receive at the same time at least towards the same direction. This is called as half-duplex constraint and it causes additional restrictions to the radio resource allocation and scheduling.

SUMMARY

According to an aspect, there is provided an apparatus comprising at least one processor and at least one memory including computer code for one or more programs, the at least one memory and the computer code configured, with the at least one processor, to cause the apparatus at least to support for a determined period at least one hop within a multi-hop self-backhaul communications, wherein the determined period comprises: a first part within which information for controlling dynamic allocation between backhaul and access links within resource slots is passed between the apparatus and at least one further apparatus in the multi-hop self-backhaul communications; and a second part within which a dynamic slot pattern is implemented based on the information for controlling dynamic allocation between backhaul and access links within resource slots is passed between the apparatus and at least one further apparatus in the multi-hop self-backhaul communications.

The determined period may comprise a third part within which feedback associated with the multi-hop self-backhaul is communicated back to a donor apparatus configured to determine the dynamic allocation for a further period and at least for a first hop.

The third part may comprise a predefined resource slot resource allocation between backhaul downlink, backhaul uplink, access downlink and access uplink resource slots.

The third part may comprise a dynamic resource slot resource allocation between backhaul downlink, backhaul uplink, access downlink and access uplink resource slots based on the information for controlling dynamic allocation between backhaul and access links within resource slots.

The third part may comprise a predefined resource allocation for backhaul uplink and the rest of the resources allocated dynamically between backhaul downlink, backhaul uplink, access downlink and access uplink based on the information for controlling dynamic allocation between backhaul and access links within resource slots.

The third part may comprise a number of resource slot resources dependent on a total number of hops in the multi-hop self-backhaul communications.

The first part may comprise a predefined resource slot resource allocation between backhaul downlink, backhaul uplink, access downlink and access uplink resource slots.

The first part may comprise a predefined resource slot resource allocation for backhaul downlink and the rest of the resources allocated dynamically between backhaul downlink, backhaul uplink, access downlink and access uplink based on the information for controlling dynamic allocation between backhaul and access links within resource slots as configured in the previous period or interval.

The first part may comprise a number of resource slot resources dependent on a total number of hops in the multi-hop self-backhaul communications.

The apparatus may be further caused to: receive information for controlling dynamic allocation between backhaul and access links within resource slots between the apparatus and a higher hop apparatus in the multi-hop self-backhaul communications; generate and transmit information for controlling dynamic allocation between backhaul and access links within resource slots between the apparatus and a lower hop apparatus in the multi-hop self-backhaul communications in an available downlink fixed resource slot following receiving the information from the higher hop apparatus in the multi-hop self-backhaul communications within the first part of the determined period.

The apparatus caused to generate and transmit information for controlling dynamic allocation between backhaul and access links within resource slots between the apparatus and a lower hop apparatus in the multi-hop self-backhaul communications may be caused to: generate the information for controlling dynamic allocation between backhaul and access links within resource slots between the apparatus and the lower hop apparatus at least based on the received information for controlling dynamic allocation between backhaul and access links within resource slots between the apparatus and the higher hop apparatus; transmit the generated information for controlling dynamic allocation between backhaul and access links within resource slots between the apparatus and the lower hop apparatus.

The apparatus caused to generate and transmit information for controlling dynamic allocation between backhaul and access links within resource slots between the apparatus and a lower hop apparatus in the multi-hop self-backhaul communications may be caused to forward the information for controlling dynamic allocation between backhaul and access links within resource slots between the apparatus and a higher hop apparatus as the information for controlling dynamic allocation between backhaul and access links within resource slots between the apparatus and the lower hop apparatus to the lower hop apparatus.

The information for controlling dynamic allocation between backhaul and access links within resource slots between the apparatus and the higher hop and/or lower hop apparatus in the multi-hop self-backhaul communications may comprise a backhaul hop count from a donor apparatus.

The information may comprise information to control dynamic allocation between backhaul and access links within time division multiplex resource slots based on a backhaul hop count from a donor apparatus or separately for each hop.

The information may comprise information to control dynamic allocation between backhaul and access links within resource slots for one of: one or more time division resource slots; and one or more portions of a resource slot.

The apparatus may be configured to configure the apparatus allocation between backhaul and access links within resource slots for the second part of the determined period based on the information for controlling dynamic allocation between backhaul and access links within resource slots.

The dynamic slot pattern may contain at least one of following properties: the pattern is a preconfigured pattern; the pattern is defined by the information; the pattern consists of a shorter pattern repeated over the second part; the pattern is identified by an index from a set of tabulated patterns.

The information for controlling dynamic allocation between backhaul and access links within resource slots may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The apparatus may be caused to: generate a feedback message when the apparatus is the hop furthest from a donor node; or otherwise receive a feedback message from at least one further apparatus; forward the feedback message or a modified version of the feedback message to another apparatus in an available uplink fixed resource slot following receiving the feedback message in the multi-hop self-backhaul communications within the third part of the determined period.

The apparatus caused to support for a determined period at least one hop within a multi-hop self-backhaul communications may be caused to operate within at least one of: a time division duplex communications system wherein the resource slots are separated in time domain; and a frequency division duplex communications system wherein the resource slots are separated in frequency domain. The resource slots are radio resource slots used for uplink or downlink transmission on either access or backhaul link.

According to a second aspect there is provided a method comprising supporting multi-hop self-backhaul communications in an apparatus for a determined period and at least one hop, wherein the determined period comprises: a first part within which information for controlling dynamic allocation between backhaul and access links within resource slots is passed between the apparatus and at least one further apparatus in the multi-hop self-backhaul communications; and a second part within which a dynamic slot pattern is implemented based on the information for controlling dynamic allocation between backhaul and access links within resource slots is passed between the apparatus and at least one further apparatus in the multi-hop self-backhaul communications.

The determined period may further comprise a third part within which feedback associated with the multi-hop self-backhaul is communicated back to a donor apparatus configured to determine the dynamic allocation for a further period and at least for a first hop.

The third part may comprise a predefined resource slot resource allocation between backhaul downlink, backhaul uplink, access downlink and access uplink resource slots.

The third part may comprise a dynamic resource slot resource allocation between backhaul downlink, backhaul uplink, access downlink and access uplink resource slots based on the information for controlling dynamic allocation between backhaul and access links within resource slots. The third part may comprise a predefined resource allocation for backhaul uplink and the rest of the resources allocated dynamically between backhaul downlink, backhaul uplink, access downlink and access uplink based on the information for controlling dynamic allocation between backhaul and access links within resource slots.

The third part may comprise a number of resource slot resources dependent on a total number of hops in the multi-hop self-backhaul communications.

The first part may comprise a predefined resource slot resource allocation between backhaul downlink, backhaul uplink, access downlink and access uplink resource slots.

The first part may comprise a predefined resource slot resource allocation for backhaul downlink and the rest of the resources allocated dynamically between backhaul downlink, backhaul uplink, access downlink and access uplink based on the information for controlling dynamic allocation between backhaul and access links within resource slots as configured in the previous period or interval.

The first part may comprise a number of resource slot resources dependent on a total number of hops in the multi-hop self-backhaul communications.

The method may further comprise: receiving information for controlling dynamic allocation between backhaul and access links within resource slots between the apparatus and a higher hop apparatus in the multi-hop self-backhaul communications; generating and transmitting information for controlling dynamic allocation between backhaul and access links within resource slots between the apparatus and a lower hop apparatus in the multi-hop self-backhaul communications in an available downlink fixed resource slot following receiving the information from the higher hop apparatus in the multi-hop self-backhaul communications within the first part of the determined period.

Generating and transmitting information for controlling dynamic allocation between backhaul and access links within resource slots between the apparatus and a lower hop apparatus in the multi-hop self-backhaul communications may comprise: generating the information for controlling dynamic allocation between backhaul and access links within resource slots between the apparatus and the lower hop apparatus at least based on the received information for controlling dynamic allocation between backhaul and access links within resource slots between the apparatus and the higher hop apparatus; and transmitting the generated information for controlling dynamic allocation between backhaul and access links within resource slots between the apparatus and the lower hop apparatus.

Generating and transmitting information for controlling dynamic allocation between backhaul and access links within resource slots between the apparatus and a lower hop apparatus in the multi-hop self-backhaul communications may comprise forwarding the information for controlling dynamic allocation between backhaul and access links within resource slots between the apparatus and a higher hop apparatus as the information for controlling dynamic allocation between backhaul and access links within resource slots between the apparatus and the lower hop apparatus to the lower hop apparatus.

The information for controlling dynamic allocation between backhaul and access links within resource slots between the apparatus and the higher hop and/or lower hop apparatus in the multi-hop self-backhaul communications may comprise a backhaul hop count from a donor apparatus.

The information may comprise information to control dynamic allocation between backhaul and access links within time division multiplex resource slots based on a backhaul hop count from a donor apparatus or separately for each hop.

The information may comprise information to control dynamic allocation between backhaul and access links within resource slots for one of: one or more time division resource slots; and one or more portions of a resource slot.

The method may comprise configuring the apparatus allocation between backhaul and access links within resource slots for the second part of the determined period based on the information for controlling dynamic allocation between backhaul and access links within resource slots.

The dynamic slot pattern may contain at least one of following properties: the pattern is a preconfigured pattern; the pattern is defined by the information; the pattern consists of a shorter pattern repeated over the second part; the pattern is identified by an index from a set of tabulated patterns.

The information for controlling dynamic allocation between backhaul and access links within resource slots may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The method may comprise: generating a feedback message when the apparatus is the hop furthest from a donor node, or otherwise receiving a feedback message from at least one further apparatus; forwarding the feedback message or a modified version of the feedback message to another apparatus in an available uplink fixed resource slot immediately following receiving the feedback message in the multi-hop self-backhaul communications within the third part of the determined period.

Supporting for a determined period at least one hop within a multi-hop self-backhaul communications may comprise operating within at least one of: a time division duplex communications system wherein the resource slots are separated in time domain; and a frequency division duplex communications system wherein the resource slots are separated in frequency domain. The resource slots are radio resource slots used for uplink or downlink transmission on either access or backhaul link.

According to a third aspect there is provided an apparatus comprising: means for supporting multi-hop self-backhaul communications in an apparatus for a determined period and at least one hop, wherein the determined period comprises: a first part within which information for controlling dynamic allocation between backhaul and access links within resource slots is passed between the apparatus and at least one further apparatus in the multi-hop self-backhaul communications; and a second part within which a dynamic slot pattern is implemented based on the information for controlling dynamic allocation between backhaul and access links within resource slots is passed between the apparatus and at least one further apparatus in the multi-hop self-backhaul communications.

The determined period may further comprise a third part within which feedback associated with the multi-hop self-backhaul is communicated back to a donor apparatus configured to determine the dynamic allocation for a further period and at least for a first hop.

The third part may comprise a predefined resource slot resource allocation between backhaul downlink, backhaul uplink, access downlink and access uplink resource slots.

The third part may comprise a dynamic resource slot resource allocation between backhaul downlink, backhaul uplink, access downlink and access uplink resource slots based on the information for controlling dynamic allocation between backhaul and access links within resource slots.

The third part may comprise a predefined resource allocation for backhaul uplink and the rest of the resources allocated dynamically between backhaul downlink, backhaul uplink, access downlink and access uplink based on the information for controlling dynamic allocation between backhaul and access links within resource slots.

The third part may comprise a number of resource slot resources dependent on a total number of hops in the multi-hop self-backhaul communications.

The first part may comprise a predefined resource slot resource allocation between backhaul downlink, backhaul uplink, access downlink and access uplink resource slots.

The first part may comprise a predefined resource slot resource allocation for backhaul downlink and the rest of the resources allocated dynamically between backhaul downlink, backhaul uplink, access downlink and access uplink based on the information for controlling dynamic allocation between backhaul and access links within resource slots as configured in the previous period or interval.

The first part may comprise a number of resource slot resources dependent on a total number of hops in the multi-hop self-backhaul communications.

The apparatus may further comprise: means for receiving information for controlling dynamic allocation between backhaul and access links within resource slots between the apparatus and a higher hop apparatus in the multi-hop self-backhaul communications; means for generating and transmitting information for controlling dynamic allocation between backhaul and access links within resource slots between the apparatus and a lower hop apparatus in the multi-hop self-backhaul communications in an available downlink fixed resource slot following receiving the information from the higher hop apparatus in the multi-hop self-backhaul communications within the first part of the determined period.

The means for generating and transmitting information for controlling dynamic allocation between backhaul and access links within resource slots between the apparatus and a lower hop apparatus in the multi-hop self-backhaul communications may comprise: means for generating the information for controlling dynamic allocation between backhaul and access links within resource slots between the apparatus and the lower hop apparatus at least based on the received information for controlling dynamic allocation between backhaul and access links within resource slots between the apparatus and the higher hop apparatus; and means for transmitting the generated information for controlling dynamic allocation between backhaul and access links within resource slots between the apparatus and the lower hop apparatus.

The means for generating and transmitting information for controlling dynamic allocation between backhaul and access links within resource slots between the apparatus and a lower hop apparatus in the multi-hop self-backhaul communications may comprise means for forwarding the information for controlling dynamic allocation between backhaul and access links within resource slots between the apparatus and a higher hop apparatus as the information for controlling dynamic allocation between backhaul and access links within resource slots between the apparatus and the lower hop apparatus to the lower hop apparatus.

The information for controlling dynamic allocation between backhaul and access links within resource slots between the apparatus and the higher hop and/or lower hop apparatus in the multi-hop self-backhaul communications may comprise a backhaul hop count from a donor apparatus.

The information may comprise information to control dynamic allocation between backhaul and access links within time division multiplex resource slots based on a backhaul hop count from a donor apparatus or separately for each hop.

The information may comprise information to control dynamic allocation between backhaul and access links within resource slots for one of: one or more time division resource slots; and one or more portions of a resource slot.

The apparatus may comprise means for configuring the apparatus allocation between backhaul and access links within resource slots for the second part of the determined period based on the information for controlling dynamic allocation between backhaul and access links within resource slots.

The dynamic slot pattern may contain at least one of following properties: the pattern is a preconfigured pattern; the pattern is defined by the information; the pattern consists of a shorter pattern repeated over the second part; the pattern is identified by an index from a set of tabulated patterns.

The information for controlling dynamic allocation between backhaul and access links within resource slots may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The apparatus may comprise: means for generating a feedback message when the apparatus is the hop furthest from a donor node, or otherwise receiving a feedback message from at least one further apparatus; means for forwarding the feedback message or a modified version of the feedback message to another apparatus in an available uplink fixed resource slot immediately following receiving the feedback message in the multi-hop self-backhaul communications within the third part of the determined period.

The means for supporting for a determined period at least one hop within a multi-hop self-backhaul communications may comprise means for operating within at least one of: a time division duplex communications system wherein the resource slots are separated in time domain; and a frequency division duplex communications system wherein the resource slots are separated in frequency domain. The resource slots are radio resource slots used for uplink or downlink transmission on either access or backhaul link.

According to a fourth aspect there is provided a computer program comprising instructions for causing an apparatus to perform at least the following supporting multi-hop self-backhaul communications in an apparatus for a determined period and at least one hop, wherein the determined period comprises: a first part within which information for controlling dynamic allocation between backhaul and access links within resource slots is passed between the apparatus and at least one further apparatus in the multi-hop self-backhaul communications; and a second part within which a dynamic slot pattern is implemented based on the information for controlling dynamic allocation between backhaul and access links within resource slots is passed between the apparatus and at least one further apparatus in the multi-hop self-backhaul communications.

The determined period may further comprise a third part within which feedback associated with the multi-hop self-backhaul is communicated back to a donor apparatus configured to determine the dynamic allocation for a further period and at least for a first hop.

The third part may comprise a predefined resource slot resource allocation between backhaul downlink, backhaul uplink, access downlink and access uplink resource slots.

The third part may comprise a dynamic resource slot resource allocation between backhaul downlink, backhaul uplink, access downlink and access uplink resource slots based on the information for controlling dynamic allocation between backhaul and access links within resource slots.

The third part may comprise a predefined resource allocation for backhaul uplink and the rest of the resources allocated dynamically between backhaul downlink, backhaul uplink, access downlink and access uplink based on the information for controlling dynamic allocation between backhaul and access links within resource slots.

The third part may comprise a number of resource slot resources dependent on a total number of hops in the multi-hop self-backhaul communications.

The first part may comprise a predefined resource slot resource allocation between backhaul downlink, backhaul uplink, access downlink and access uplink resource slots.

The first part may comprise a predefined resource slot resource allocation for backhaul downlink and the rest of the resources allocated dynamically between backhaul downlink, backhaul uplink, access downlink and access uplink based on the information for controlling dynamic allocation between backhaul and access links within resource slots as configured in the previous period or interval.

The first part may comprise a number of resource slot resources dependent on a total number of hops in the multi-hop self-backhaul communications.

The apparatus may further be caused to perform: receiving information for controlling dynamic allocation between backhaul and access links within resource slots between the apparatus and a higher hop apparatus in the multi-hop self-backhaul communications; generating and transmitting information for controlling dynamic allocation between backhaul and access links within resource slots between the apparatus and a lower hop apparatus in the multi-hop self-backhaul communications in an available downlink fixed resource slot following receiving the information from the higher hop apparatus in the multi-hop self-backhaul communications within the first part of the determined period.

Generating and transmitting information for controlling dynamic allocation between backhaul and access links within resource slots between the apparatus and a lower hop apparatus in the multi-hop self-backhaul communications may cause the apparatus to perform: generating the information for controlling dynamic allocation between backhaul and access links within resource slots between the apparatus and the lower hop apparatus at least based on the received information for controlling dynamic allocation between backhaul and access links within resource slots between the apparatus and the higher hop apparatus; and transmitting the generated information for controlling dynamic allocation between backhaul and access links within resource slots between the apparatus and the lower hop apparatus.

Generating and transmitting information for controlling dynamic allocation between backhaul and access links within resource slots between the apparatus and a lower hop apparatus in the multi-hop self-backhaul communications may cause the apparatus to perform forwarding the information for controlling dynamic allocation between backhaul and access links within resource slots between the apparatus and a higher hop apparatus as the information for controlling dynamic allocation between backhaul and access links within resource slots between the apparatus and the lower hop apparatus to the lower hop apparatus.

The information for controlling dynamic allocation between backhaul and access links within resource slots between the apparatus and the higher hop and/or lower hop apparatus in the multi-hop self-backhaul communications may comprise a backhaul hop count from a donor apparatus.

The information may comprise information to control dynamic allocation between backhaul and access links within time division multiplex resource slots based on a backhaul hop count from a donor apparatus or separately for each hop.

The information may comprise information to control dynamic allocation between backhaul and access links within resource slots for one of: one or more time division resource slots; and one or more portions of a resource slot.

The apparatus may be further caused to perform configuring the apparatus allocation between backhaul and access links within resource slots for the second part of the determined period based on the information for controlling dynamic allocation between backhaul and access links within resource slots.

The dynamic slot pattern may contain at least one of following properties: the pattern is a preconfigured pattern; the pattern is defined by the information; the pattern consists of a shorter pattern repeated over the second part; the pattern is identified by an index from a set of tabulated patterns.

The information for controlling dynamic allocation between backhaul and access links within resource slots may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The apparatus may be further caused to perform: generating a feedback message when the apparatus is the hop furthest from a donor node, or otherwise receiving a feedback message from at least one further apparatus; forwarding the feedback message or a modified version of the feedback message to another apparatus in an available uplink fixed resource slot immediately following receiving the feedback message in the multi-hop self-backhaul communications within the third part of the determined period.

Supporting for a determined period at least one hop within a multi-hop self-backhaul communications may cause the apparatus to operate within at least one of: a time division duplex communications system wherein the resource slots are separated in time domain; and a frequency division duplex communications system wherein the resource slots are separated in frequency domain. The resource slots are radio resource slots used for uplink or downlink transmission on either access or backhaul link.

According to a fifth aspect there is provided a computer readable medium comprising program instructions for causing an apparatus to perform at least the following supporting multi-hop self-backhaul communications in an apparatus for a determined period and at least one hop, wherein the determined period comprises: a first part within which information for controlling dynamic allocation between backhaul and access links within resource slots is passed between the apparatus and at least one further apparatus in the multi-hop self-backhaul communications; and a second part within which a dynamic slot pattern is implemented based on the information for controlling dynamic allocation between backhaul and access links within resource slots is passed between the apparatus and at least one further apparatus in the multi-hop self-backhaul communications.

The determined period may further comprise a third part within which feedback associated with the multi-hop self-backhaul is communicated back to a donor apparatus configured to determine the dynamic allocation for a further period and at least for a first hop.

The third part may comprise a predefined resource slot resource allocation between backhaul downlink, backhaul uplink, access downlink and access uplink resource slots.

The third part may comprise a dynamic resource slot resource allocation between backhaul downlink, backhaul uplink, access downlink and access uplink resource slots based on the information for controlling dynamic allocation between backhaul and access links within resource slots.

The third part may comprise a predefined resource allocation for backhaul uplink and the rest of the resources allocated dynamically between backhaul downlink, backhaul uplink, access downlink and access uplink based on the information for controlling dynamic allocation between backhaul and access links within resource slots.

The third part may comprise a number of resource slot resources dependent on a total number of hops in the multi-hop self-backhaul communications.

The first part may comprise a predefined resource slot resource allocation between backhaul downlink, backhaul uplink, access downlink and access uplink resource slots.

The first part may comprise a predefined resource slot resource allocation for backhaul downlink and the rest of the resources allocated dynamically between backhaul downlink, backhaul uplink, access downlink and access uplink based on the information for controlling dynamic allocation between backhaul and access links within resource slots as configured in the previous period or interval.

The first part may comprise a number of resource slot resources dependent on a total number of hops in the multi-hop self-backhaul communications.

The apparatus may further be caused to perform: receiving information for controlling dynamic allocation between backhaul and access links within resource slots between the apparatus and a higher hop apparatus in the multi-hop self-backhaul communications; generating and transmitting information for controlling dynamic allocation between backhaul and access links within resource slots between the apparatus and a lower hop apparatus in the multi-hop self-backhaul communications in an available downlink fixed resource slot following receiving the information from the higher hop apparatus in the multi-hop self-backhaul communications within the first part of the determined period.

Generating and transmitting information for controlling dynamic allocation between backhaul and access links within resource slots between the apparatus and a lower hop apparatus in the multi-hop self-backhaul communications may cause the apparatus to perform: generating the information for controlling dynamic allocation between backhaul and access links within resource slots between the apparatus and the lower hop apparatus at least based on the received information for controlling dynamic allocation between backhaul and access links within resource slots between the apparatus and the higher hop apparatus; and transmitting the generated information for controlling dynamic allocation between backhaul and access links within resource slots between the apparatus and the lower hop apparatus.

Generating and transmitting information for controlling dynamic allocation between backhaul and access links within resource slots between the apparatus and a lower hop apparatus in the multi-hop self-backhaul communications may cause the apparatus to perform forwarding the information for controlling dynamic allocation between backhaul and access links within resource slots between the apparatus and a higher hop apparatus as the information for controlling dynamic allocation between backhaul and access links within resource slots between the apparatus and the lower hop apparatus to the lower hop apparatus.

The information for controlling dynamic allocation between backhaul and access links within resource slots between the apparatus and the higher hop and/or lower hop apparatus in the multi-hop self-backhaul communications may comprise a backhaul hop count from a donor apparatus.

The information may comprise information to control dynamic allocation between backhaul and access links within time division multiplex resource slots based on a backhaul hop count from a donor apparatus or separately for each hop.

The information may comprise information to control dynamic allocation between backhaul and access links within resource slots for one of: one or more time division resource slots; and one or more portions of a resource slot.

The apparatus may be further caused to perform configuring the apparatus allocation between backhaul and access links within resource slots for the second part of the determined period based on the information for controlling dynamic allocation between backhaul and access links within resource slots.

The dynamic slot pattern may contain at least one of following properties: the pattern is a preconfigured pattern; the pattern is defined by the information; the pattern consists of a shorter pattern repeated over the second part; the pattern is identified by an index from a set of tabulated patterns.

The information for controlling dynamic allocation between backhaul and access links within resource slots may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The apparatus may be further caused to perform: generating a feedback message when the apparatus is the hop furthest from a donor node, or otherwise receiving a feedback message from at least one further apparatus; forwarding the feedback message or a modified version of the feedback message to another apparatus in an available uplink fixed resource slot immediately following receiving the feedback message in the multi-hop self-backhaul communications within the third part of the determined period.

Supporting for a determined period at least one hop within a multi-hop self-backhaul communications may cause the apparatus to operate within at least one of: a time division duplex communications system wherein the resource slots are separated in time domain; and a frequency division duplex communications system wherein the resource slots are separated in frequency domain. The resource slots are radio resource slots used for uplink or downlink transmission on either access or backhaul link.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

The concept as discussed in further detail hereafter focuses on wireless relay operation (self-backhauling a.k.a. integrated access and backhaul, IAB) on top of a NR frame structure. Furthermore, these embodiments as discussed hereafter focus on a time division duplex (TDD) relay scenario, where the relay is configured with support for wireless relay operation. In other embodiments scenarios where radio resources can be allocated between backhaul and access links, as well as between uplink (UL) and downlink (DL) in a flexible manner are discussed while minimizing both access and backhaul link latencies. In some embodiments a frequency division duplex (FDD) relay scenario may be envisaged wherein the following examples may be modified such that the radio resource slots being allocated between uplink and downlink transmissions are separated in frequency domain rather than in time domain.

Before explaining in detail the examples, certain general principles of a wireless communication system and mobile communication devices are briefly explained with reference to FIGS. 1 to 2 to assist in understanding the technology underlying the described examples.

Figure 1:
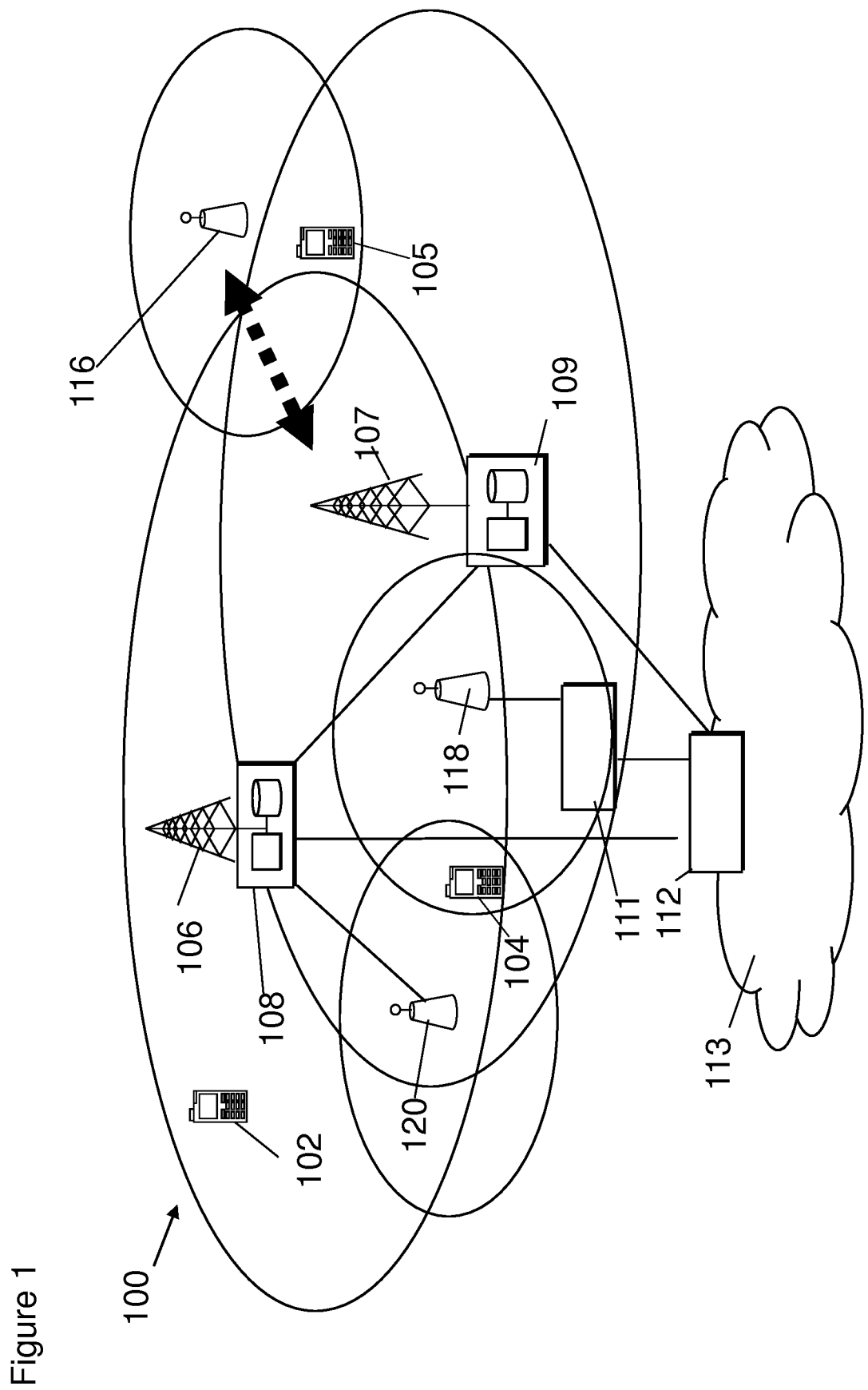
FIG. 1 shows a schematic diagram of an example communication system comprising a plurality of base stations and a plurality of communication devices.

In a wireless communication system 100, such as that shown in FIG. 1, mobile communication devices or user equipment (UE) 102, 104, 105 are provided wireless access via at least one access point or similar wireless transmitting and/or receiving node or point. An access point or base station is referred to as a Node B or generally NB (for example an eNB in LTE and gNB in 5G NR). Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE (and 5G) systems may however be considered to have a so-called "flat" architecture, without the provision of RNCs; rather the NB is in communication with a system architecture evolution gateway (SAE-GW) and a mobility management entity (MME), which entities may also be pooled meaning that a plurality of these nodes may serve a plurality (set) of NBs. Each UE is served by only one MME and/or S-GW at a time and the NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations (or relay nodes or RN) 116, 118 and 120 may also be connected to the network 113, for example by a separate gateway function and/or via the controllers of the macro level stations. The relay nodes may be considered to contain user equipment (UE) functionality which facilitates backhaul connection between the donor gNB (DgNB) or a serving relay node in the case of a multi-hop scenario. Furthermore the relay node may be considered to contain gNB functionality which facilitates access link connection between UEs within the relay node cell as well as the backhaul connection for relay nodes served by the current relay node (when the relay node is operating as a serving relay node in a multi-hop scenario.

In the following a higher hop may be understood to be the communications from an apparatus and a further apparatus towards the donor access node, for example a communications hop between a relay node and a donor access node, and a lower hop may be understood to be the communications from an apparatus and a further apparatus towards the user equipment, for example a communications hop between a relay node acting as a serving relay node and a further relay node.

The base stations 116, 118 and 120 may be pico or femto level base stations or the like. In the example, station 118 is connected via a gateway 111 whilst station 120 connects via the controller apparatus 108. The station 116 may be connected via station 107 as will be explained in further detail hereafter. In some embodiments, the smaller stations may not be provided.

Figure 2:
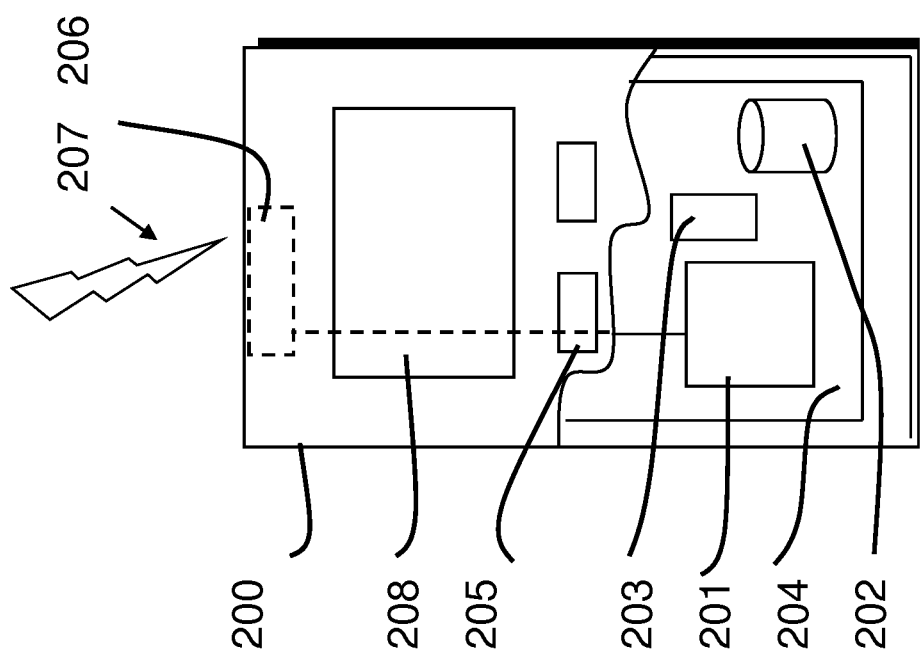
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals.

Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques. In some embodiments the relaying operation may be transparent to the UE.

Figure 3:
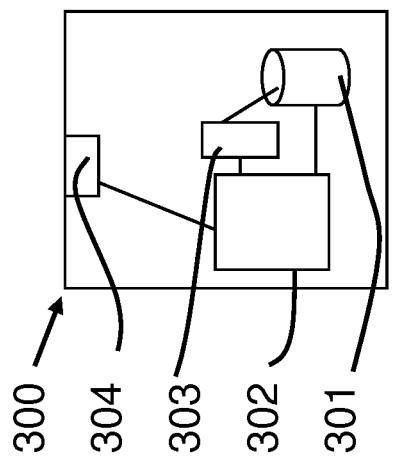
FIG. 3 shows a schematic diagram of an example control apparatus.

An example control apparatus (and/or base station) is shown in FIG. 3. FIG. 3 shows an example of a control apparatus provided in a base station or access point. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 302/303 can be configured to execute an appropriate software code to provide the control functions.

An example of wireless communication systems are architectures standardized by the 3rd Generation Partnership Project (3GPP). The currently being developed 3GPP based development, release 15, is often referred to as the 5G NR standards part of long term evolution (LTE) or LTE Advanced Pro of the Universal Mobile Telecommunications System (UMTS) radio-access technology. Other examples of radio access system comprise those provided by base stations of systems that are based on technologies such as Multefire (or other unlicensed access such as LTE-U), wireless local area network (WLAN) and/or WiMax (Worldwide Interoperability for Microwave Access).

As discussed earlier one of the aspects of these wireless communications systems is multi-hop wireless relay operation (suitable for both access and self-backhauling) on top of the NR frame structure. In particular a TDD relay scenario which has an inbuilt support for wireless relay operation (due to the fact that typically in the TDD case transmission and reception take place in the same frequency band). However it is understood that the following examples may be modified to represent a FDD relay scenario where transmission and reception can take place at the same time on one link.

Figure 4:
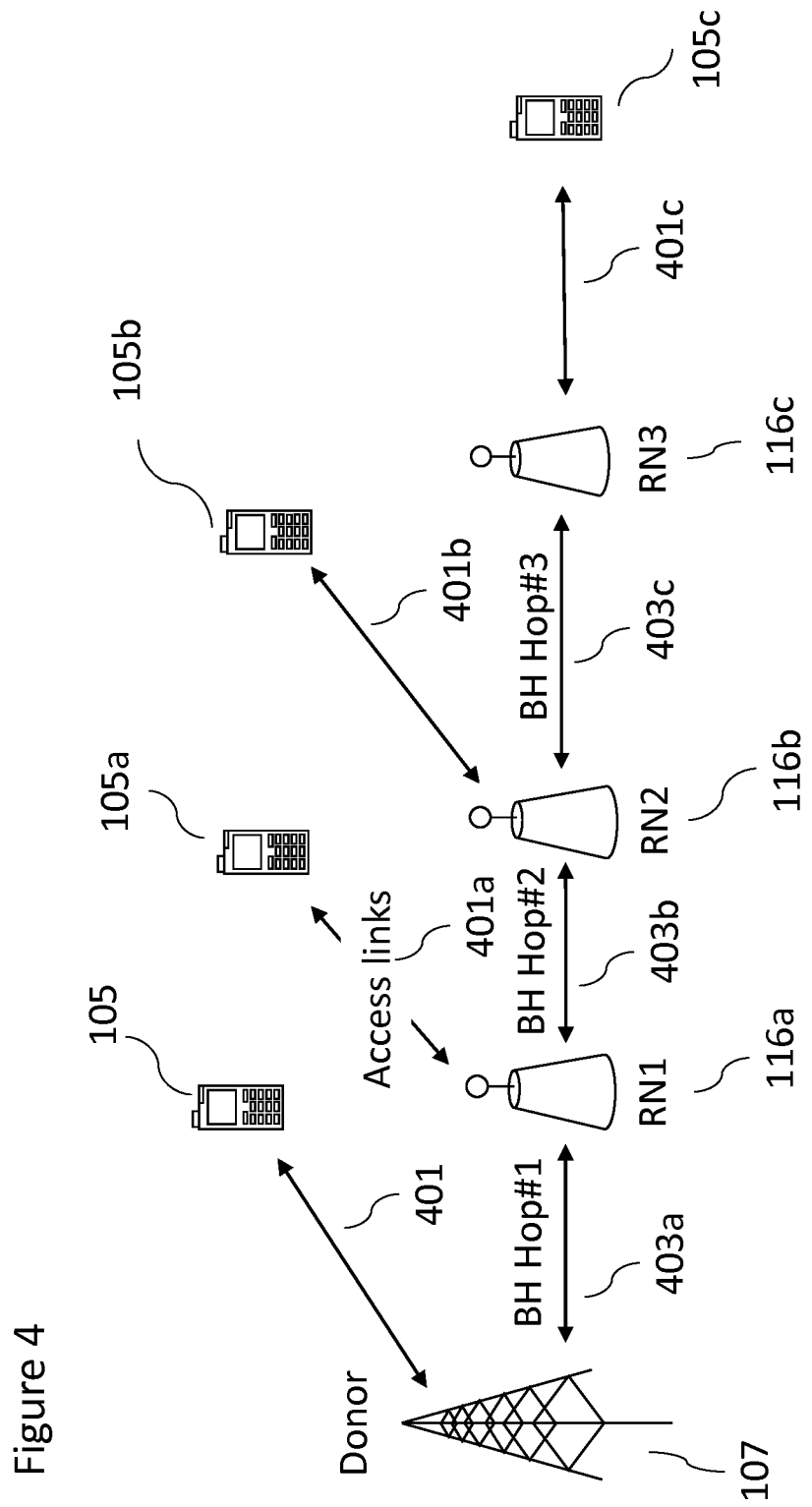
FIG. 4 shows example backhaul link configurations.

With respect to FIG. 4, an example of separate links existing in a 3 hop scenario is shown. The example shows a gNB (or donor gNB or donor) 107, a first relay node (RN) 116a, a second relay node (RN) 116b, a third relay node (RN) 116c, a first UE 105, a second UE 105a, a third UE 105b, a fourth UE 105c. In this scenario there are access links between a node and UE, which may for example be a first uplink/downlink access link 401 between the gNB 107 and the first UE 105, a second uplink/downlink access link 401a between the first RN 116a and the second UE 105a, a third uplink/downlink access link 401b between the second RN 116b and the third UE 105b, and a third uplink/downlink access link 401c between the third RN 116c and the fourth UE 105d. Furthermore, in FIG. 4 is shown the backhaul links or links between access points/relay nodes. For example, there is shown in FIG. 4 a first hop backhaul link (BH Hop #1) 403a between the first RN 116a and gNB 107, a second hop backhaul link (BH Hop #2) 403b between the second RN 116b and first RN 116a and a third hop backhaul link (BH Hop #3) 403c between the third RN 116c and second RN 116b.

Assuming the half-duplex constraint for RNs, the resource allocation for BH and access links of a RN affects the usage of slots for the next RN in the multi-hop chain. In other words the resource allocation for backhaul and access links (including also uplink and downlink) in the first hop of the chain thus affects the possibility for any further or following relaying nodes (RN) to select the usage of the time slots either for access and backhaul (BH) for the following hop to the next RN. Furthermore, information about any (dynamic) allocation of radio resources by any of the nodes in the upstream of the multi-hop chain has to be propagated through the chain up to the last RN in the chain. As the BH connection is not available all the time, there will be a delay with the information transfer over all hops in the RN chain.

For instance, referring to FIG. 4, if RN1 is allocated to receive BH DL (transmission from gNB to RN1) in a slot, there cannot be BH DL transmission from RN1 to RN2 in that slot. The slot could then be available for RN2 as an access slot to communicate towards UEs or for forwarding BH traffic to RN3. On the other hand, if a slot for RN1 is allocated as an access slot (no BH traffic in that slot between gNB and RN1), RN2 could be allocated to receive in that slot BH DL transmission from RN1 and using the slot for access DL traffic or BH DL traffic towards RN3 would not be possible. The slot could then be available for access DL of RN3.

The following embodiments and examples focus on time division duplex (TDD) in-band relay operation, which is also called self-backhaul. However, at least certain embodiments of the invention are covered also by other known relay operation types.

A solution allowing adaptation to the traffic and radio conditions by enabling reconfiguration of the radio resources on per given period at the time is described in the following embodiments to attempt to produce a relatively less complex solution when compared to fully dynamic operations.

Figure 5:
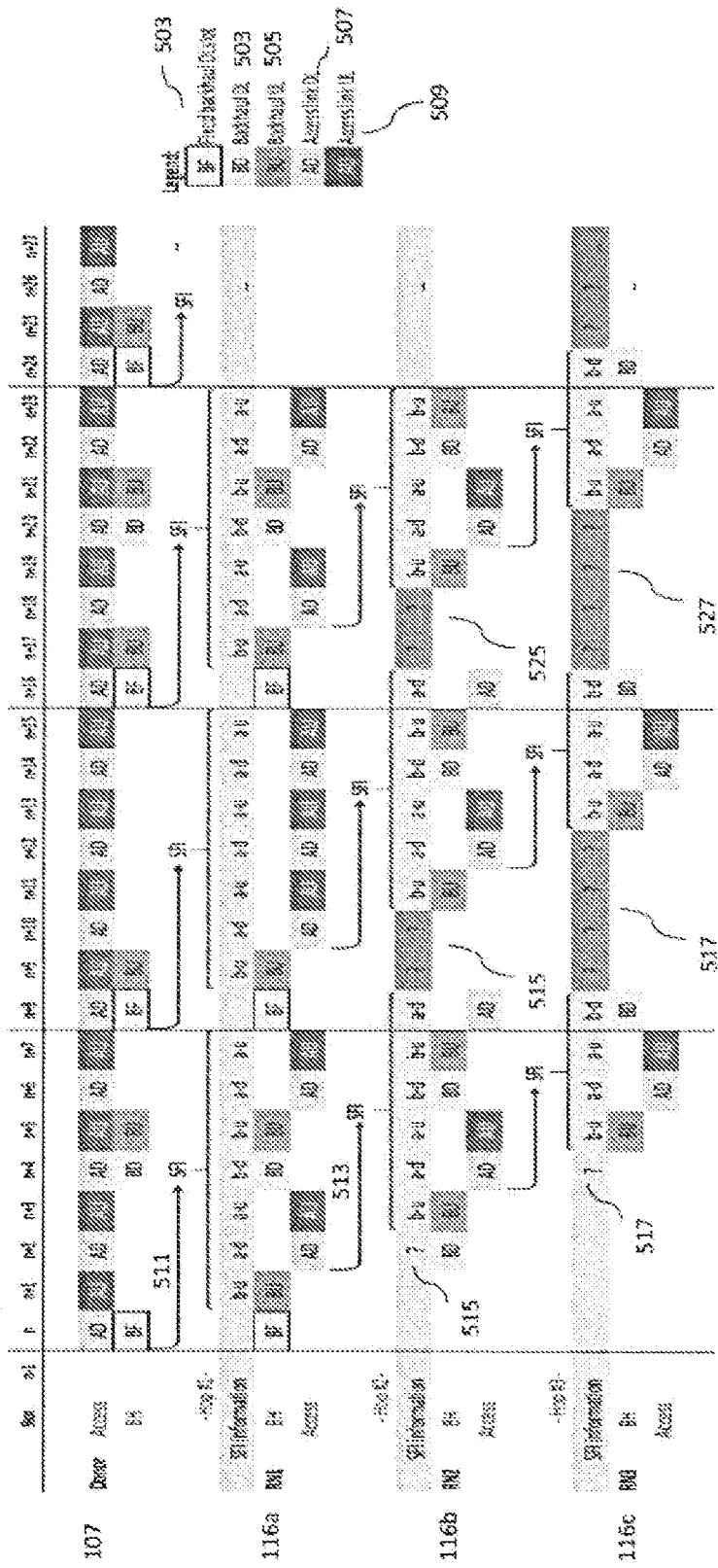
FIG. 5 shows example slot allocation in a substantially dynamically allocated backhaul configuration.

FIG. 5 shows an example of slot allocation within a substantially fully dynamic resource allocation system where the Donor gNB 107 is the master device determining the initial allocation of slots and further determining where the RNs can allocate the access resources (allocated by the previous node, either Donor or RN) either for access or BH for the following BH link. The figure shows the slots from n−1 to n+27, which are divided into slot periods, shown in FIG. 5 as periods of 8 slots. Each slot may be allocated as a backhaul slot (fixed backhaul downlink BF 501, backhaul downlink BD 503, or backhaul uplink BU 505) or an access slot (access link downlink AD 505 or access link uplink AU 507).

In this example, there is a fixed allocation of DL slots (which are shown as backhaul downlink BF 501) for the BH connection between Donor 107 and the 1st RN 116a. This fixed allocation has a periodicity which in the example is (relatively) short, 8 slots in this case. The Donor gNB 107 signals to first RN 116a the resource allocation (in Slot Format Indication, SFI 511) for the given period. Based on the SFI 511, the first RN 116a communicates either with the Donor gNB 107 in the allocated BH slots and with the second RN 116b in its access slots (while communicating also with the UEs in its own cell). The first RN 116a has to forward also the allocation information to the second RN 116b in the first slot used for BH of the Hop #2 shown by the SFI 513. This introduces a delay (in this example shown as 2 slots of delay) for the SFI forwarding. A similar delay is introduced also in the following hop. Overall, several slots are needed for the SFI to propagate through the chain of RNs. The relative share of the delay compared to the allocation period increases with the number of hops. Furthermore, the delay causes ambiguity at the RNs in the multi-hop chain as the SFI reaches the RNs later than they already should use the information. Such time slots are shown as the slots "?" 515, 525 with respect to the second relay node 116b and slots 517, 527 with respect to the third relay node 116c.

The concept as discussed hereafter is one in which dynamic resource allocation is implemented in a multi-hop self-backhaul scenario. In these examples a half-duplex relaying is assumed where RN cannot transmit and receive at the same time (at least towards the same direction). Furthermore, the following disclosure assumes that the dynamic resource allocation methods described hereafter cover traffic adaptation between DL and UL, as well as between access and backhaul links.

The concept as discussed in further detail hereafter is one which follows the following principles:

Firstly that there is a determined periodicity where the re-configuration of resource allocation is enabled. At the beginning of this period, there is a pre-configured pattern of resource allocation for BH and access links. This pre-configured pattern allows resource allocation information to be propagated through the RN chain. Furthermore the length of the pre-configured pattern can be fixed or configurable to adapt possible variations in the number of hops in the RN chain.

The pre-configured pattern can in some embodiments allow feedback (in other words data transfer upstream) to enable data acknowledgement to verify the success of the re-configuration. The acknowledgement can be facilitated e.g. based on L1 control signalling such as ACK-feedback transmitted on physical uplink control channel (PUCCH) or physical uplink shared channel (PUSCH). Another option for feedback would be to send the acknowledgement by means of higher layer signalling.

Following the preconfigured pattern part of the period, there is a determined dynamic slot pattern which has been configured/signalled during the preconfigured pattern. The configured slot pattern determines at least the slot allocations either for backhaul or access for the following RN and until the end of the period, or until a pre-defined allocation part (for example for feedback) of the period. This dynamic slot pattern furthermore may also determine the link direction at least for the determined backhaul slots.

The RN, at any point in the multi-hop chain, can be configured to configure the access slots, based on the dynamic slot pattern slot allocations configured by the serving Donor or RN, either for BH or access slots for the following RN in the chain.

In some embodiments the available slot allocation patterns are predefined (or tabulated) and the donor gNB (DgNB) and/or relay node (RN) selects one pattern for each period.

Furthermore in some embodiments the preconfigured slot allocations follow a predefined UL/DL split common for DgNB and all involved RNs. In some embodiments the preconfigured slot allocations (including predefined UL/DL split) defined within the pattern may vary between different periods.

In some embodiments all the resource allocations are centralized at the Donor and RNs are not able to determine access/BH split on the BH links.

In some embodiments the RN is explicitly or implicitly informed about its location in the multi-hop chain.

Furthermore in some embodiments the location information (with respect to the location of the RN in the multi-hop chain or the hop count value from the donor apparatus) can be used at the RN. For example in some embodiments this information is used to determine in which slot to expect resource allocation to be received over the BH link, and/or, in which slot to send possible feedback information.

In some embodiments the explicit information can be an information element in the signalling. Thus for example the Donor node can be configured to set a value to "1" (to indicate a first hop) and the value incremented by each RN node in the multi-hop chain before transferring the information element to a further following RN.

In some embodiments the RN can determine its location within the chain from the timing of receiving the resource allocation information assuming the Donor sends the information always in the 1st slot of the configuration period, and, based on the knowledge of the pre-configured allocation pattern in the beginning of the configuration period (in such a manner the location in the chain can be implicitly signalled).

In some embodiments only the BH DL slots carrying dynamic resource allocation information are fixed in time and other slots in the pattern are subject to dynamic allocation as configured in the previous period or interval.

In some embodiments the allocation period can be determined as a variable length period which is indicated in the resource allocation information. In such embodiments the indicated allocation period is followed by the transfer of the resource allocation information for the next period. The transfer of the resource allocation information for the following period may in some embodiments comprise a fixed pattern of BH/access slots to allow the SFI information to propagate to all RNs in a multi-hop chain in a manner similar to the fixed length allocation above.

Additionally in some embodiments to improve the adaptation capabilities, there can be an appropriate resource allocation pattern at the end of the configured period to allow feedback information to be transferred through the multi-hop chain to the donor gNB. In such embodiments the feedback may include information about the buffer sizes and/or congestion both for BH and access connections of each RN. The feedback may furthermore also suggest suitable division between access/BH and/or DL/UL allocations (for example in the form of predefined patterns). The feedback in some embodiments may also indicate a current division between access/BH and/or DL/UL allocations (for example in the form of predefined patterns). The pattern of the feedback period in some embodiments is selected to be long enough to allow information to traverse the whole chain, enabling also acknowledgements at each hop. Thus in some embodiments where the RN is aware of its location in the multi-hop chain (either by explicit or implicit methods as described above), the RN knows when to send the feedback information upstream over the BH connection. The determination of when to send feedback information is relevant for the last RN in the chain as it does not forward any feedback from other RNs and thus it has to know when to trigger the feedback. Following RNs in upstream could initiate the feedback transmission when receiving feedback information from the RN below in the chain.

In some embodiments any upstream transfer of feedback can be distributed through the configuration period without definite timing or specific resource allocation pattern, and be configured to use the allocated UL slots of each backhaul connection. In such embodiments all information collected by the Donor until the beginning of the following configuration period, can be utilized in defining the allocation for the next period. In such a manner it may be possible to optimise the dynamic part of the configuration period.

In some embodiments the feedback and SFI transfer periods may overlap and may therefore minimize or reduce the fixed part of the configuration period. These embodiments require a delay in the use of the feedback information for the next configuration period.

In some embodiments the configuration of the SSB (Synchronization Signal Block) transmissions and corresponding PRACH resources may be considered when determining the resource allocations for the configuration period. In such embodiments the SSB transmission/PRACH opportunities can be used to overrule the (dynamic) resource allocation, or, the resource allocation shall consider the SSB TX timing. Furthermore in some embodiments the period of the resource configuration can be the same as the length of the SSB burst set. In these embodiments the SSBs will affect the same slots (assuming the SSB TX configuration is fairly static) even when the resource allocation is changed from one period to another. It should be noted that the SSB burst set length can be for example be set as a half-frame (5 ms) whereas the SSB burst set periodicity can be longer (default value 20 ms). Hence in some embodiments not all configuration periods are affected by the SSB transmission With respect to FIG. 6 an example application of resource allocation according to some embodiments applied for a 3-hop case is shown. In this example the configuration period or resource configuration periodicity 601 is 40 slots. This period may therefore be 5 ms with 120 kHz sub-carrier spacing (and where each slot length is 0.125 ms).

Figure 6:
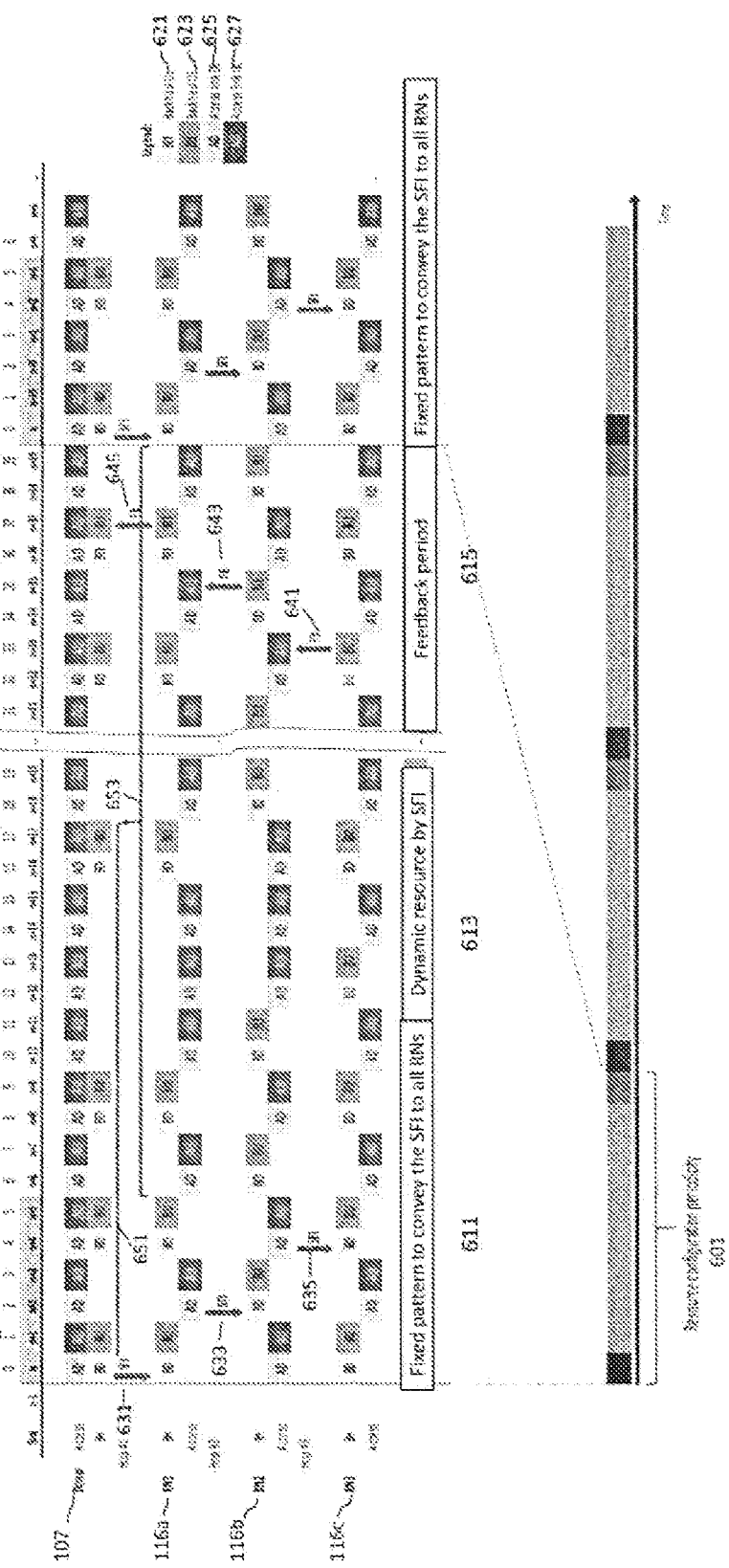
FIG. 6 shows an example slot allocation in a backhaul configuration according to some embodiments.

In the illustrated example shown in FIG. 6 the RNs are allowed to allocate access resources (indicated by the SFI from previous node) for access and BH connections for the following (next hop) BH link.

At the beginning of the configuration period 601 is shown a pre-configured allocation pattern 611 where configuration information can be transferred through the multi-hop (in this case up to 3-hops) chain. Thus in the 1st slot (n) the Donor gNB 107 is configured to send SFI (Slot Format Indication) or otherwise named information 631 defining the resource allocation pattern for the configuration period. In some embodiments the information may comprise explicit information for the whole period, or it can be a (shorter) pattern repeated over the configuration period. Any suitable method of passing the information or signalling the information may be implemented in other embodiments.

The SFI (or configuration information in general) is forwarded or transmitted from the first RN 116a to the second RN 116b at the 1st slot available for second hop downlink, this is shown in FIG. 6 by the SFI information 633 in slot n+2.

The second RN 116b then is configured to forward or transmit the information, shown by the SFI information 635, to the third RN 116c in the first slot available for the third hop downlink, which as shown in the example in FIG. 6 is slot n+4. In some embodiments the SFI forwarded or transmitted may be modified before sending. This process would then be repeated for further hops.

Having received the configuration information in the allocation pattern part 611 of the configuration period 601, the allocation pattern may then be implemented within the resource allocation period 613 part of the configuration period 601. Thus the first RN 116a is configured to apply the resource allocation and uses the indicated BH slots (DL and UL) for BH data reception/transfer and the rest of the slots for access connection in its own cell and/or for BH communication over the second hop. The SFI information can thus change at each hop in the situation where a RN is allocating some of the access slots allocated to it for BH connection on the following hop.

In some embodiments the resource allocation period part 613 extends to the end of the configuration period 601 however as shown in FIG. 6 in some embodiments the configuration period comprises a further feedback period 615 which starts at the end of the resource allocation period part 613 to the end of the configuration period 601. The feedback period part 615 in some embodiments is allocated for the feedback transmission and may be defined within the resource allocation configuration information or is a fixed/pre-defined pattern for a given hop count. Thus for example as shown in FIG. 6 a feedback message 641 is passed on the third hop link between the third RN 116c and the second RN 116b, this feedback message may then be modified by the second RN 116b and forwarded on the next available backhaul uplink slot as a feedback message 643 to the first RN 116a over the second hop link. This feedback message 643 may then be modified by the first RN 116a and forwarded on the next available backhaul uplink slot as a feedback message 645 to the donor gNB 107 over the first hop link.

In some embodiments the feedback period 615 is considered to be defined as a combined 'feedback and configuration information (SFI forwarding)' period which 'bookends' the resource allocation period or may be seen as overlapping between configuration periods as feedback is gathered and then a next configuration period allocation pattern part determined based on the feedback.

The timely propagation of SFI or feedback requires a fixed set of BH slots but not that every slot of every hop is preconfigured over the period of SFI or feedback forwarding. For instance in some embodiments the DgNB 107 could be configured to dynamically indicate through SFI (or other information types) that the slots n+4 and n+5 are not be used for backhauling between the DgNB and first RN but are free for access links of the first RN. However, these access slots of the first RN would then be different from the normal access slots as the first RN would not be able to use them for BH DL or UL with the second RN because the second RN is 'known' to communicate with the third RN in those slots.

In some embodiments the SFI (or generally configuration information) may be signalled either with physical downlink control channel (PDCCH) downlink control information (DCI) or media access control (MAC) control element (CE). In some embodiments the same SFI may be signalled to all RNs connected to a Donor gNB, thus some common signalling may also be possible.

In some embodiments the periodicity and configuration of the fixed pattern may be configured/signalled using radio resource control methods. The configuration may include also a default pattern for the dynamically part.

In some embodiments the SFI information can have different coding.

In some embodiments the SFI or information may coded as a bitmap. The length of the bitmap may be the whole configuration period, or, may defines a shorter pattern to be repeated during the configuration period.

In some embodiments there can be two bitmaps, one for Access/BH split and another for UL/DL division.

In some embodiments the information may be defined with an index for a pre-defined pattern. In such embodiments there can be a set, or multiple sets, of resource allocation patterns, defining the allocation for access and BH as well as UL and DL. Each pattern may be indexed and the SFI information is the selected index value. These pattern sets can be defined for different pattern lengths, up to the configuration period. Furthermore in some embodiments the indicated pattern is repeated through the configuration period when shorter than the period. The patterns and indexes can be configurable and can be signalled by RRC or any suitable in system information signalling. In some embodiments any other suitable coding option may be implemented for sending allocation/configuration information and furthermore for encoding feedback.

To improve the reliability in some embodiments the SFI (or information) could be sent in multiple slots. Thus in such embodiments where the RN does not receive the SFI as expected the RN is configured to attempt reception in the RN's next preconfigured BD slot or in the next slot in the dynamic allocation period. Before receiving the SFI, the RN operates according to the fixed (default) pattern or, in the dynamic allocation period, with the assumption that every slot is a BD slot. In some further embodiments the system is configured to operate according to a semi-statically configured pattern in the cases when RN has not received dynamic SFI. A RN n could indicate to the RN n+1 that it had missed the SFI. Furthermore, it is possible for a DgNB or RN to switch dynamic adaptation (between BH/Access and/or UL/DL) off (and on) by means for MAC CE. When dynamic adaptation is switched off, RN may assume fixed (default) pattern and may not monitor SFI.

Alternatively in some embodiments a RN failing to receive the SFI at the default BH slot, is configured to attempt to decode that in the slots that can be derived as BH DL slots based on the allocation patterns. With a limited set of patterns, there can be slots that are always BH DL slots (likewise there can be slots always access slots which can be used for communication in the RN cells until the valid allocation has been received). In some further embodiments, or additionally, fixed slots for SSB transmission can carry SFI information for the case where initial reception has failed.

In such a manner the system as described in these embodiments enables resource allocation to adapt varying traffic and radio conditions over multiple hops of self-backhauling.

It may be applicable for normal slot types, and could also exploit the enhanced flexibility of NR mini-slots. The SFI signalling may be carried out with a resolution of a slot, or a fraction of the slot where the slot is divided into different portions, such as DL BH, UL BH, DL access, UL access, guard period, unused OFDM symbols, reserved OFDM symbols etc.

Such embodiments can adapt to varying schemes for SSB transmission and may allow reliable transfer of the configuration information through the multi-hop chain as well as the feedback from all RNs of the chain.

Figure 7:
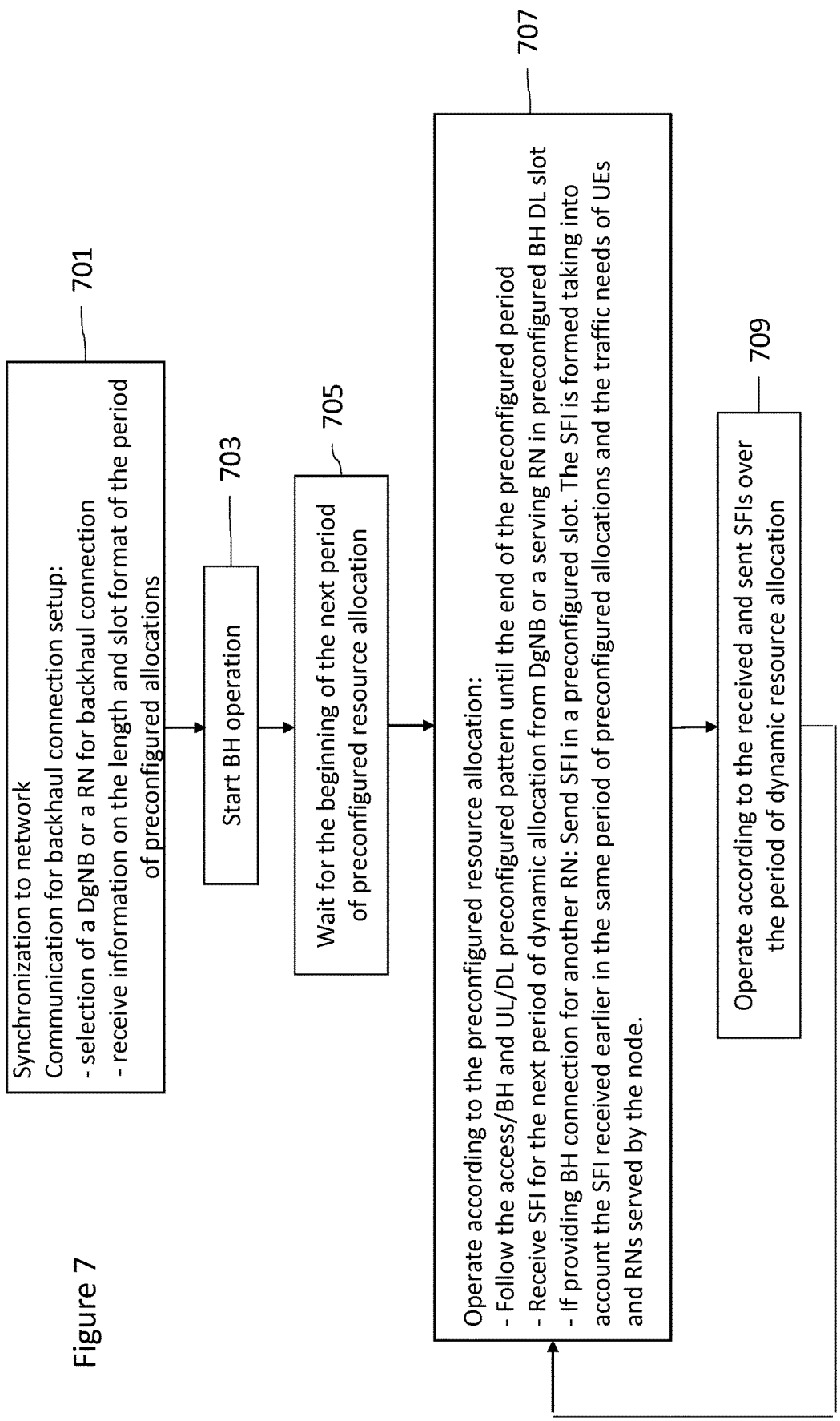
FIG. 7 shows a flowchart of an example method for flexible backhaul adaptation according to some embodiments.

With respect to FIG. 7 an example flow diagram of the operation of a node within the backhaul system according to some embodiments is shown.

In some embodiments the node (for example the DgNB or RN) is configured initialize and setup for the backhaul operations as shown in FIG. 7 by step 701. For example the initialization is configured to synchronise the node to the network. Furthermore the node is configured to setup by a selection of a DgNB or a RN for backhaul connection and receive information on a length and slot format of the period of preconfigured allocations.

Having performed setup the node may be configured to start the backhaul configuration as shown in FIG. 7 by step 703.

The node may then be configured to wait for the beginning of the next period of preconfigured resource allocation as shown in FIG. 7 by step 705.

Having determined the beginning of the next period the node may be configured to operate according to the preconfigured resource allocation as shown in FIG. 7 by step 707. Thus in some embodiments the node is configured to follow the access/BH and UL/DL preconfigured pattern until the end of the preconfigured period. Furthermore the node is configured to receive the SFI (or generally configuration information) for the next period of dynamic allocation from a DgNB or a serving RN in a preconfigured BH DL slot. In some embodiments where the node is providing a BH connection for another RN the node is configured to send SFI in a preconfigured slot. The SFI is formed taking into account the SFI received earlier in the same period of preconfigured allocations and the traffic needs of the UEs and RNs served by the node.

Having configured itself the node may then be configured to operate according to the received and sent SFIs (or generally configuration information) over the period of dynamic resource allocation as shown in FIG. 7 by step 709.

The node may then pass back to the operation step 707 for the next period.

Figure 8:
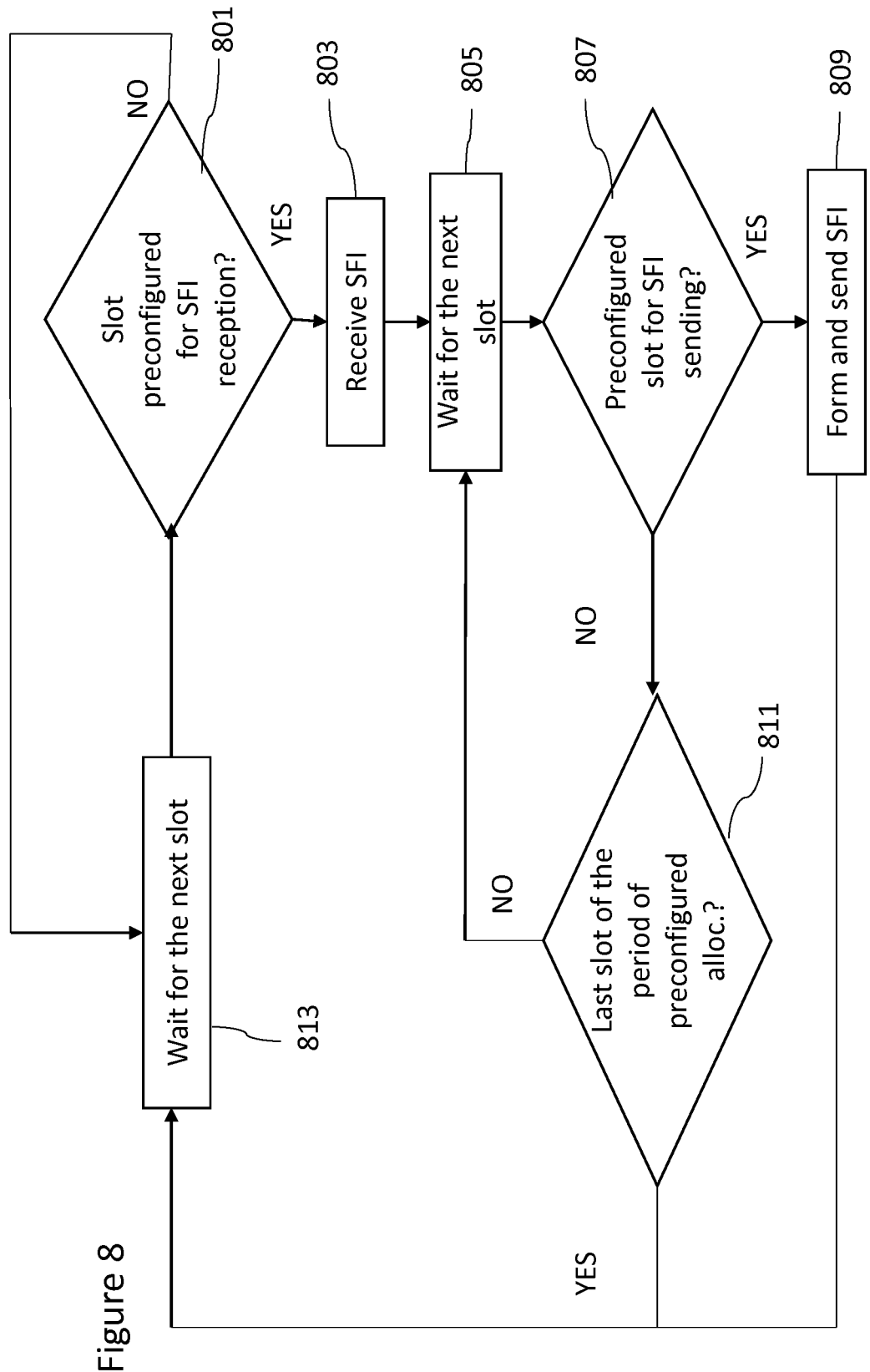
FIG. 8 shows a flowchart of a detail of the method for flexible backhaul adaptation according to some embodiments.

With respect to FIG. 8 a flow diagram shows an example SFI or configuration information forwarding operation according to some embodiments.

Thus in a first operation the node is configured to check whether the slot is preconfigured for SFI reception as shown in FIG. 8 by step 801.

Where the slot is not preconfigured then the operation passes to a waiting for the next slot operation as shown in FIG. 813 and which then passes back to the step 801.

Where the slot is preconfigured for reception then the node may be configure to receive the SFI message as shown in FIG. 8 by step 803.

The node may then be configured to wait for the next slot as shown in FIG. 8 by step 805.

Having waited for the next slot the node may be configured to check whether the slot is a preconfigured slot for SFI sending as shown in FIG. 8 by step 807.

Where the slot is a preconfigured slot for SFI sending then the node may form and send the SFI as shown in FIG. 8 by step 809. The operation may then pass back to step 813 where a next slot is waited for.

Where the slot is not a preconfigured slot for SFI sending then the node may be configured to check whether the slot is the last slot of the period of preconfigured allocation as shown in FIG. 8 by step 811.

Where the slot is the last slot of the period of preconfigured allocation then the node may be configured to pass back to step 813 where a next slot is waited for before detecting whether the next slot is a slot preconfigured for SFI reception.

Where the slot is not the last slot of the period of preconfigured allocation then the node may be configured to pass back to step 805 where a next slot is waited for before detecting whether the next slot is a slot preconfigured for SFI sending.

The embodiments as discussed herein supports self BH transparent to UE (due to the fact that symbol timing in access link does not depend on the BH link) It should be understood that each block of the flowchart of the Figures and any combination thereof may be implemented by various means or their combinations, such as hardware, software, firmware, one or more processors and/or circuitry.

It is noted that whilst embodiments have been described in relation to one example of an unlicensed spectrum network, similar principles maybe applied in relation to other examples of networks. It should be noted that other embodiments may be based on other cellular technology other than LTE or on variants of LTE. For example, some embodiments may be used with so-called 5G New Radio or MulteFire. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising at least one processor and at least one memory including computer code for one or more programs, the at least one memory and the computer code configured, with the at least one processor, to cause the apparatus at least to:

support for a determined period at least one hop within a multi-hop self-backhaul communications, wherein the determined period comprises:
- a first part within which information for controlling dynamic allocation between backhaul and access links within resource slots is passed between the apparatus and at least one further apparatus in the multi-hop self-backhaul communications; and
- a second part within which a dynamic slot pattern is implemented based on the information for controlling dynamic allocation between backhaul and access links within resource slots is passed between the apparatus and at least one further apparatus in the multi-hop self-backhaul communications;

receive information for controlling dynamic allocation between backhaul and access links within resource slots between the apparatus and a higher hop apparatus in the multi-hop self-backhaul communications;

generate the information for controlling dynamic allocation between backhaul and access links within resource slots between the apparatus and the lower hop apparatus at least based on the received information for controlling dynamic allocation between backhaul and access links within resource slots between the apparatus and the higher hop apparatus; and transmit the generated information for controlling dynamic allocation between backhaul and access links within resource slots between the apparatus and the lower hop apparatus.

2. The apparatus as claimed in claim 1, wherein the determined period comprises a third part within which feedback associated with the multi-hop self-backhaul is communicated back to a donor apparatus configured to determine the dynamic allocation for a further period and at least for a first hop.

3. The apparatus as claimed in claim 2, wherein the third part comprises at least one of:
- a predefined resource allocation between backhaul downlink, backhaul uplink, access downlink and access uplink resource slots; and
- dynamic time slot resource allocation between backhaul downlink, backhaul uplink, access downlink and access uplink resource slots based on the information for controlling dynamic allocation between backhaul and access links within resource slots; or
- a predefined resource allocation for backhaul uplink and the rest of the resources allocated dynamically between backhaul downlink, backhaul uplink, access downlink and access uplink based on the information for controlling dynamic allocation between backhaul and access links within resource slots.

4. The apparatus as claimed in claim 2, wherein the third part comprises a number of resource slot resources dependent on a total number of hops in the multi-hop self-backhaul communications.

5. The apparatus as claimed in claim 2, wherein the apparatus is caused to:
- generate a feedback message when the apparatus is the hop furthest from a donor node; or otherwise
- receive a feedback message from at least one further apparatus; and
- forward the feedback message or a modified version of the feedback message to another apparatus in an available uplink fixed resource slot immediately following receiving the feedback message in the multi-hop self-backhaul communications within the third part of the determined period.

6. The apparatus as claimed in claim 1, wherein the first part comprises at least one of:
- a predefined resource slot resource allocation between backhaul downlink, backhaul uplink, access downlink and access uplink resource slots; or
- a predefined resource slot resource allocation for backhaul downlink and the rest of the resources allocated dynamically between backhaul downlink, backhaul uplink, access downlink and access uplink based on the information for controlling dynamic allocation between backhaul and access links within resource slots as configured in the previous period or interval.

7. The apparatus as claimed in claim 1, wherein the first part comprises a number of resource slot resources dependent on a total number of hops in the multi-hop self-backhaul communications.

8. The apparatus as claimed in claim 1, wherein the apparatus caused to generate and transmit information for controlling dynamic allocation between backhaul and access links within resource slots between the apparatus and a lower hop apparatus in the multi-hop self-backhaul communications is caused to forward the information for controlling dynamic allocation between backhaul and access links within resource slots between the apparatus and a higher hop apparatus as the information for controlling dynamic allocation between backhaul and access links within resource slots between the apparatus and the lower hop apparatus to the lower hop apparatus.

9. The apparatus as claimed in claim 1, wherein the information for controlling dynamic allocation between backhaul and access links within resource slots between the apparatus and the higher hop and/or lower hop apparatus in the multi-hop self-backhaul communications comprises a backhaul hop count from a donor apparatus.

10. The apparatus as claimed in claim 1, wherein the information comprises information to control dynamic allocation between backhaul and access links within resource slots based on a backhaul hop count from a donor apparatus or separately for each hop.

11. The apparatus as claimed in claim 1, wherein the information comprises information to control dynamic allocation between backhaul and access links within resource slots for one of:
- one or more resource slots; or
- one or more portions of a resource slot.

12. The apparatus as claimed in claim 1, wherein the apparatus is configured to configure the apparatus allocation between backhaul and access links within resource slots for the second part of the determined period based on the information for controlling dynamic allocation between backhaul and access links within resource slots.

13. The apparatus as claimed in claim 1, wherein the dynamic slot pattern contains at least one of following properties:
- the pattern is a preconfigured pattern;
- the pattern is defined by the information;
- the pattern consists of a shorter pattern repeated over the second part; or
- the pattern is identified by an index from a set of tabulated patterns.

14. The apparatus as claimed in claim 1, wherein the information for controlling dynamic allocation between backhaul and access links within resource slots comprises information on at least one of:
- downlink control channel allocation in the backhaul;
- downlink data channel allocation in the backhaul;
- uplink control channel allocation in the backhaul;

uplink data channel allocation in the backhaul;
channel state information reference signal allocation in the backhaul downlink; or
sounding reference signal allocation in the backhaul uplink.

15. The apparatus as claimed in claim 1, wherein the apparatus caused to support for a determined period at least one hop within a multi-hop self-backhaul communications is caused to operate within at least one of:
 a time division duplex communications system wherein the resource slots are separated in time domain; or
 a frequency division duplex communications system wherein the resource slots are separated in frequency domain.

16. A method comprising:
supporting multi-hop self-backhaul communications in an apparatus for a determined period and at least one hop, wherein the determined period comprises:
 a first part within which information for controlling dynamic allocation between backhaul and access links within resource slots is passed between the apparatus and at least one further apparatus in the multi-hop self-backhaul communications; and
 a second part within which a dynamic slot pattern is implemented based on the information for controlling dynamic allocation between backhaul and access links within resource slots is passed between the apparatus and at least one further apparatus in the multi-hop self-backhaul communications;
receiving information for controlling dynamic allocation between backhaul and access links within resource slots between the apparatus and a higher hop apparatus in the multi-hop self-backhaul communications;
generating the information for controlling dynamic allocation between backhaul and access links within resource slots between the apparatus and the lower hop apparatus at least based on the received information for controlling dynamic allocation between backhaul and access links within resource slots between the apparatus and the higher hop apparatus; and
transmitting the generated information for controlling dynamic allocation between backhaul and access links within resource slots between the apparatus and the lower hop apparatus.

17. An apparatus comprising at least one processor and at least one memory including computer code for one or more programs, the at least one memory and the computer code configured, with the at least one processor, to cause the apparatus at least to:
support for a determined period at least one hop within a multi-hop self-backhaul communications, wherein the determined period comprises:
 a first part within which information for controlling dynamic allocation between backhaul and access links within resource slots is passed between the apparatus and at least one further apparatus in the multi-hop self-backhaul communications; and
 a second part within which a dynamic slot pattern is implemented based on the information for controlling dynamic allocation between backhaul and access links within resource slots is passed between the apparatus and at least one further apparatus in the multi-hop self-backhaul communications;
receive information for controlling dynamic allocation between backhaul and access links within resource slots between the apparatus and a higher hop apparatus in the multi-hop self-backhaul communications; and
forward the information for controlling dynamic allocation between backhaul and access links within resource slots between the apparatus and a higher hop apparatus as the information for controlling dynamic allocation between backhaul and access links within resource slots between the apparatus and the lower hop apparatus to the lower hop apparatus.

\* \* \* \* \*